(12) United States Patent
Sawyer et al.

(10) Patent No.: US 7,689,979 B1
(45) Date of Patent: Mar. 30, 2010

(54) METHODS AND APPARATUS TO IMPROVE APPLICATION LAUNCH TIME

(75) Inventors: David G. Sawyer, San Jose, CA (US); Dylan Ashe, San Jose, CA (US); Brent E. Rosenquist, San Jose, CA (US)

(73) Assignee: Adobe Systems Inc., San Jose, CA (US)

( * ) Notice: Subject to any disclaimer, the term of this patent is extended or adjusted under 35 U.S.C. 154(b) by 1275 days.

(21) Appl. No.: 11/195,450

(22) Filed: Aug. 2, 2005

(51) Int. Cl.
*G06F 9/45* (2006.01)
*G06F 9/44* (2006.01)

(52) U.S. Cl. .................. 717/152; 717/110; 717/159; 717/168

(58) Field of Classification Search ......... 717/110–111, 717/151–154, 159, 168–169
See application file for complete search history.

(56) References Cited

U.S. PATENT DOCUMENTS

| | | | |
|---|---|---|---|
| 5,175,856 A * | 12/1992 | Van Dyke et al. | 717/151 |
| 5,381,550 A * | 1/1995 | Jourdenais et al. | 717/149 |
| 5,701,489 A * | 12/1997 | Bates et al. | 717/157 |
| 5,812,855 A * | 9/1998 | Hiranandani et al. | 717/157 |
| 5,857,101 A * | 1/1999 | Ballard et al. | 713/1 |
| 5,933,630 A * | 8/1999 | Ballard et al. | 713/1 |
| 6,202,121 B1 * | 3/2001 | Walsh et al. | 717/175 |
| 7,100,156 B2 * | 8/2006 | Archambault | 717/159 |
| 7,356,813 B2 * | 4/2008 | Liu et al. | 717/163 |
| 2002/0166115 A1 * | 11/2002 | Sastry | 717/151 |
| 2003/0041312 A1 * | 2/2003 | Fueki | 717/100 |

OTHER PUBLICATIONS

Chapman et al., "Dragon: An Open64-Based Interactive Program Analysis Tool for Large Applications"; IEEE, 2003, 5 pgs.*

* cited by examiner

*Primary Examiner*—Wei Y Zhen
*Assistant Examiner*—Ryan D. Coyer
(74) *Attorney, Agent, or Firm*—Chapin IP Law, LLC

(57) ABSTRACT

Modification of source code reduces a launch time associated with an application program so that the application program more quickly responds to input from a user after startup. One technique of modifying source code includes converting globally defined variables in the source code to local static variables associated with respective newly created functions. Inclusion of the globally defined variables in the source code impacts application launch time because a compiler creates initialization code associated with the globally defined variables that must be run at launch time to initialize the variables in case they are used by functions in the application program. On the other hand, local static variables are initialized when the function that contains them is first called. Thus, use of local static variables in respective newly created functions in lieu of globally defined variables reduce application program launch time.

25 Claims, 4 Drawing Sheets

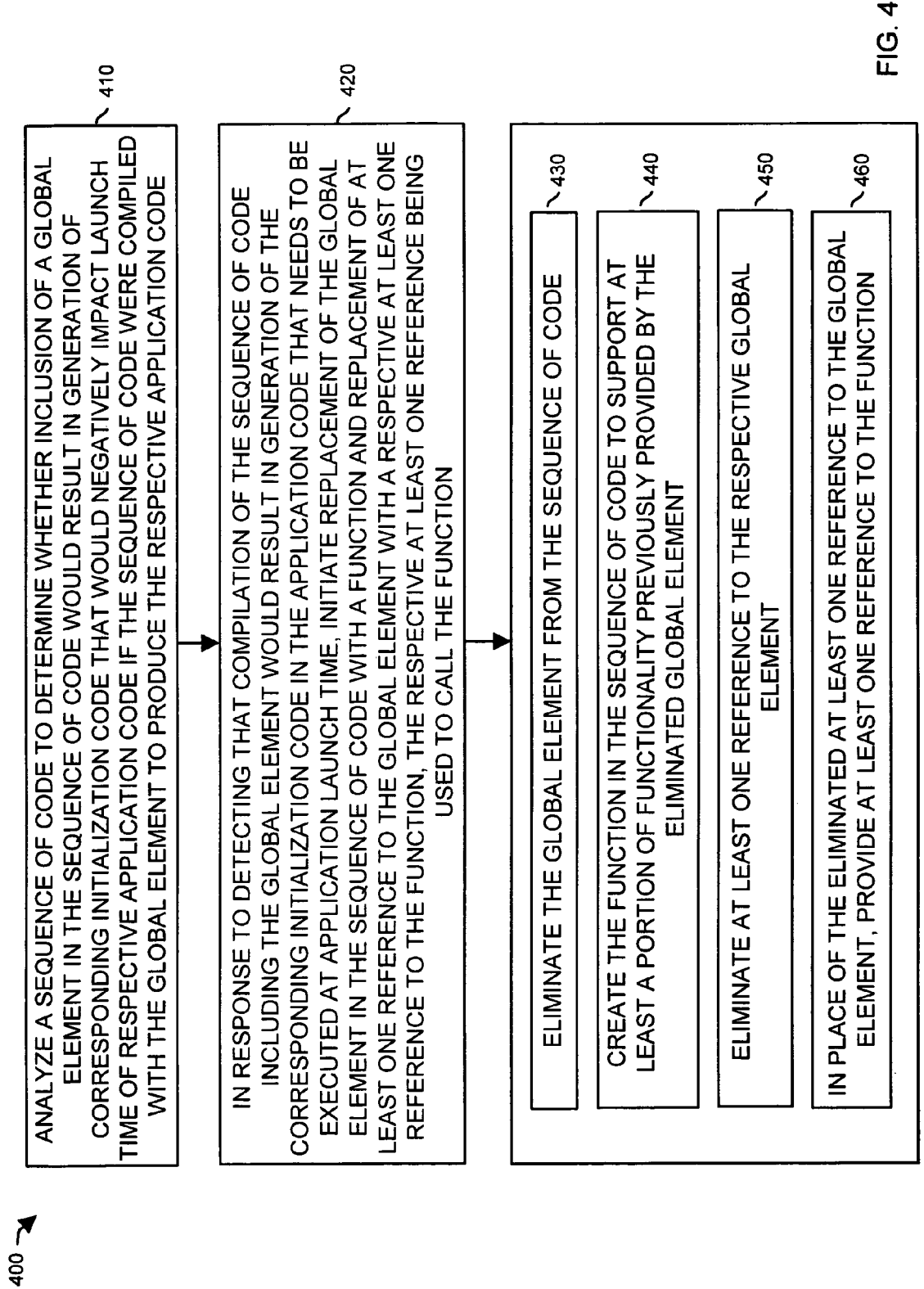

METHODS AND APPARATUS TO IMPROVE APPLICATION LAUNCH TIME

BACKGROUND

Software application programs have long been used to perform tasks for computer users. For example, via use of a corresponding computer, a user can launch an application program such as a word processor application to modify or create a text-based file. To initiate execution of the application program, the user clicks on an icon of a computer display screen to launch the application program. Typically, the user must wait several seconds or even several minutes before the application program to be launched on the computer. Via the graphical user interface on the display screen, the user can supply commands (such as open a file, delete text, etc.) to the application program and in order to perform different functions supported by the application program. In response to receiving the commands issued by the user, the application program performs a respective function such as opening a file, deleting or adding text, etc.

Application programs that run on computers as discussed above are typically derived from so-called source code. Initially, a developer (e.g., a group of software engineers) generates source code via a particular programming language such as C, C++, etc. Thereafter, the developer derives a respective application program from the source code via a translation process. The translation process involves converting the source code into so-called machine language that can be understood by a computer.

The first step of the translation process is usually performed by a utility known as a compiler. The compiler translates the source code into machine code that is stored in files called object files. A so-called linker combines the object files into an executable application program. A so-called link order file used by the linker identifies an ordering of how the functions in the source code shall be stored in the application program.

Source code typically includes variables and functions. The variables are commonly assigned descriptive names and enable a programmer to keep track of data values (e.g., character strings, numbers, etc.) used by the functions. In addition to references associated with the variables, the functions in the source code include one or more instructions to carry out specific tasks associated with a respective application program.

Source code can include declarations of different types of variables such as local, static, and global types of variables. A global variable as defined in the main body of source code can be accessed by any of one or more functions associated with the source code. On the other hand, local variables are defined in a respective function to which the local variable pertains and generally cannot be accessed by other functions in the source code. Instead, local variables can be accessed only by accessed by the respective function to which the local variable pertains. Thus, variables can be declared as local or global variables depending on the purpose that they serve in a respective program.

SUMMARY

Unfortunately, when source code is compiled to produce a respective application program, there is no way to determine when (or if) a global variable or static variable as defined in the source code will ever actually be used in the application program. Consequently, initialization code for initializing globally defined variables in the source code must always be generated by a compiler just in case the variables are ever used by respective functions of the application program. After compilation, a linker combines the initialization code (associated with global variables) with the other object files (associated with functions in the source code) such that the initialization code is called (or executed) before any of the functions in the object files. During run-time of the application program, the initialization code (associated with the global variables) must be accessed from disk (which can be quite slow) and executed before the application program responds to any input from a user. Thus, if there are many global variables defined in respective source code, a corresponding application program compiled from the source code will require more time to execute a respective larger amount of initialization code to initialize the global variables. This results in a proportionally longer time to launch the application program when so initiated by a user. Longer application program launch times mean that a user has to wait a longer duration of time before the user can actually provide input and use a corresponding application program.

Another deficiency associated with conventional programming techniques is the inability to easily define where the initialization code is stored in an application program derived from corresponding source code. For example, initialization code associated with static and globally defined variables is not particularly amenable to being ordered with a link order file because initialization code associated with global variables generally have no name or duplicate (generated) names. Thus, a link order file cannot be used to place the initialization code with respective functions accessed during launch of the application program. Random placement of the initialization code in the application program results in the need to page different sections of code in the application file at launch time in order to retrieve and execute the initialization code. Paging different sections of code from a disk also negatively impacts an application launch time because such accesses are quite slow.

Techniques discussed herein deviate with respect to conventional applications such as those discussed above as well as additional techniques also known in the prior art. In particular, certain embodiments herein are directed to reducing a launch time associated with an application program so that the application program more quickly responds to input from a user at startup. In other words, a user is able to launch an application program and use the application sooner than as provided by conventional techniques. For example, according to one embodiment, static and global variables are converted to local static variables. Local static variables are initialized (e.g., via corresponding initialization code) when a respective function associated with the local static variable is first called rather than at launch time when the application program is retrieved from a disk. Thus, local variables need not be initialized right away when an application program is launched. Use of global variables requires that the application program initialize the global variables at application launch time.

According to one embodiment, a global variable is converted to a local static variable by "wrapping" the variable with a newly created function that has the same scope as the old global variable. Instead of using the global variable directly, the newly created function is called to obtain the variable. Because any initialization code associated with the global variable is now incorporated in the newly created function, any initialization code associated with the global variables can be ordered via use of a link order file so that launch of the application program is more efficient. Also, and perhaps more importantly, variables are initialized when the respective function using the variable is called rather than at launch of the application program.

More specifically, a technique as further described herein involves identifying a global element declaration (e.g., declaration of a global variable) or presence of a global element (e.g., a globally defined variable in a "main" portion of source code) in a sequence of code such as source code. The global element such as a "global variable" is accessible by any function in the source code. The global element in the sequence of code is replaced with a global element function (e.g., a newly created wrapper function) that provides functionality previously provided by the global element. In addition to identifying presence of a global element, the technique as further described herein involve identifying one or more references to the global element in the sequence of code and replacing the one or more references with respective one or more references to the global element function instead of the global element. This technique of converting global elements to global element functions reduces launch time of a respective application program derived form the source code because global elements otherwise requiring initialization at application program launch time are eliminated. The functionality associated with the global element are provided by the global element functions that are initialized when they are called rather than at application program launch time.

According to one embodiment, a computer program or computer user can analyze a sequence of code to determine whether inclusion of a global element (e.g., a globally defined variable, an object, etc.) in the sequence of code would result in generation of corresponding initialization code that would negatively impact launch time of respective application code if the sequence of code were compiled with the global element to produce respective application program code. Analyzing the sequence of code can include a process of searching the sequence of code for an indication of the presence of global elements. One such indication that global elements are present in the sequence of code are occurrences of global element declarations such as those associated with: i) globally defined variables, b) static variables, and c) objects that are globally accessible by functions in the source code.

According to another embodiment, launch time performance (e.g., the time between a user clicking on icon to initiate an application program and a time when the user can provide input to control a graphical user interface associated with the application program) can be reduced so that a user does not need to wait as long to provide input to an application program. For example, in response to detecting that compilation of the sequence of code including the global element would result in generation of corresponding initialization code that would impact application program launch time, techniques herein involve initiating replacement of the global element declaration (and global element itself) in the sequence of code with the global element function and replacement of the at least one reference to a respective global element with the respective at least one reference to the global element function. Thus, functionality of the original global element is provided by a global element function.

Certain embodiments involve analyzing the source code to identify an extent to which initialization code associated with global elements will effect application program launch time and proactively modifying (e.g., manually or automatically) the source code to convert the global elements to respective functions that provide the same functionality.

One technique of identifying a presence of global element involves a user manually searching through source code to replace instances of global elements to functions as discussed above. Other embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention. This latter embodiment provides an automated way of modifying source code to reduce launch time of an application program compiled from the source code.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present application is directed to a computer program product that includes a computer readable medium having instructions stored thereon for modifying source code to include fewer globally defined variables whose presence negatively impacts application launch time of a respective application program compiled form the source code. The instructions, when carried out by a processor of a respective computer device, cause the processor to perform the steps of: i) identifying presence of global element in a sequence of code; ii) replacing the global element in the sequence of code with a global element function; iii) identifying at least one reference to the respective global element in the sequence of code; and iv) replacing the at least one reference to respective the global element with a respective at least one reference to the global element function. Other embodiments of the present application include software programs to perform any of the method embodiment steps and operations summarized above and disclosed in detail below.

Yet a further embodiment herein includes a computer readable medium encoded with modified source code that may be accessed by a computerized device, the modified source code is generated from original source code based on a process that: identifies a presence of a global element in the original source code, the global element being accessible throughout the original source code; replaces the global element in the original source code with a function that provides functionality associated with the global element; identifies at least one reference to the global element in the original source code; and replaces the at least one reference to the global element with a respective reference to the function.

As discussed above, techniques herein are well suited for reducing an application launch time. However, it should be noted that embodiments herein are not limited to use in such applications and that the techniques discussed herein are well suited for other applications as well.

It is to be understood that the system according to an embodiment herein can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA. Additional features of the embodiments herein will be further discussed in the Detailed Description section of this application and accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIG. 4 is a flowchart illustrating techniques associated with modifying code according to an embodiment herein.

DETAILED DESCRIPTION

According to one embodiment, modification of source code reduces a launch time associated with a respective application program so that the application program more quickly responds to input from a user after startup. One technique of modifying source code to reduce application program launch time includes converting global elements such as static and globally defined variables in the source code to local static variables associated with respective newly created functions. Inclusion of the static and globally defined variables in the source code impacts application launch time because a compiler creates initialization code associated with the static and globally defined variables that must be run at launch time to initialize the variables in case they are used by functions in the application program. The static and globally defined variables are eliminated from the source code and are replaced with the newly created functions that provide the same functionality but which define the variables as local static variables instead. The local static variables are initialized in the newly created functions. The local static variables are initialized when the function that contains them is first called. As mentioned, one purpose of using local static variables in respective newly created functions in lieu of using static and globally defined variables is to reduce application program launch time.

Figure 1:
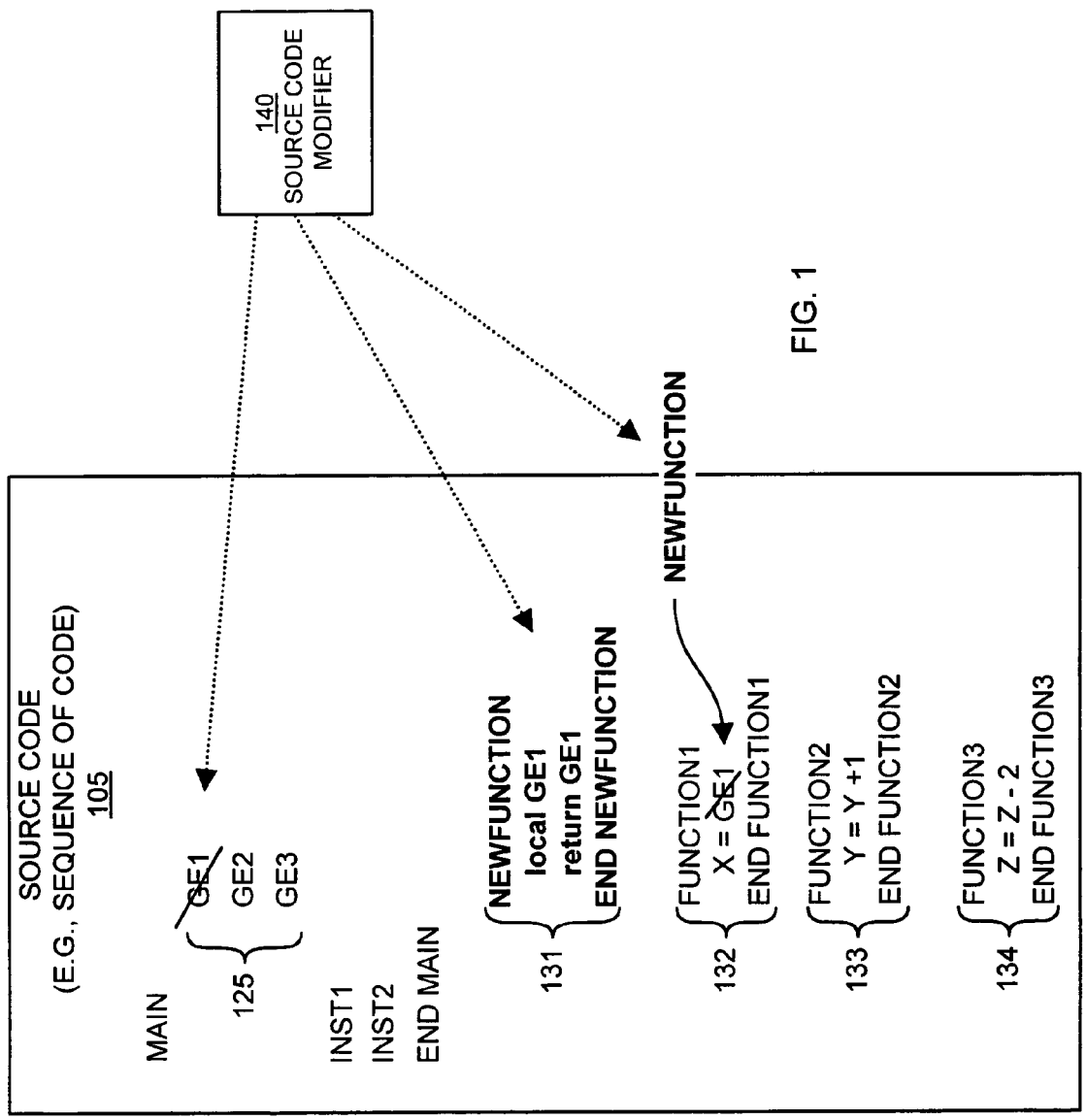
FIG. 1 is a diagram of sample source code including a global element that is converted to a corresponding function according to an embodiment herein.

FIG. 1 is a diagram illustrating a technique of modifying source code 105 according to an embodiment herein. As shown, source code 105 is a sequence of code including a main portion of a program including a declaration of global elements 125 and corresponding instructions (e.g., INST1, INST2, etc.) to perform specific program tasks. In general, a global element is an element that can be accessed (throughout the source code 105) by any statement in the source code 105 and not merely the section of code in which the element is defined. Global elements can be entities such as globally defined variable, static variables, object declarations, etc. Note that source code 105 also includes functions (e.g., function 132, function 133, function 134, etc.) that can be called to perform additional program tasks.

In the example context as shown in FIG. 1, source code 105 originally includes global elements 125 (e.g., GE1, GE2, GE3) in MAIN. Note that function 132 (namely, FUNCTION1) includes a reference to global element GE1. As previously discussed, compiling source code 105 without modifying its content results in an application program that requires additional time to launch because compilation of global elements 125 results in generation of initialization code that in the application program that must be run at launch time for initialization purposes. For example, global elements 125 (such as variables), even though not necessarily used in an application, must be initialized before an application enables a user to provide input commands. Accordingly, a user must wait while a processor function retrieves and executes a launched application from disk as well as the initialization code (e.g., initializers) associated with the global elements.

Note also that an ability of a process function to access disk (that stores the application program being launched) is typically quite limited compared to an ability of the processor function to execute code. In the above example, initialization code associated with the global elements 125 in the application program are typically not efficiently ordered via use of a link order file because initialization code generally have no names or duplicate names. The initialization code associated with global elements is thus scattered in the application program. This results in the need to page initialization code scattered in the application program stored on disk, further increasing an application program launch time.

As shown in FIG. 1, according to one embodiment, source code modifier 140 (e.g., an automated process or human operator) analyzes the source code 105 to identify the presence of global elements 125 that impact launch time of a respective application program. In other words, accesses to disk are typically slow. For example, source code modifier 140 identifies a presence of global element GE1. Global element GE1 is accessible by all of the functions and generally any instruction in the source code 105. Source code modifier 140 eliminates global element GE1 and creates function 131 (e.g., NEWFUNCTION) to provide the functionality associated with global element GE1. Further, source code modifier 140 identifies references to the eliminated global element and replaces such references with references to the newly created function NEWFUNCTION. More specifically, source code modifier 140 replaces the reference in function 132 to global element GE1 with a reference to function 131 named NEWFUNCTION. Thus, functionality associated with source code 105 generally remains the same except application program launch time is reduced.

According to one configuration, global element GE1 is a globally defined variable in a programming language such as C. In this example, the source code modifier 140 defines the function 131 to include a local static variable (e.g., local GE1) for maintaining a data value previously maintained by the eliminated globally defined variable GE1 in MAIN. The local static variable GE1 in NEWFUNCTION and respective data value associated with GE1 persist even after a call to the function 131 to access the respective data value. In other words, the source code modifier 140 can define the function 131 so that a respective data value (e.g., GE1) associated with the corresponding function 131 is initialized only upon first execution of the function 131 during execution of corresponding executable code compiled from the source code 105. Thus, in one embodiment, source code modifier 140 provides instructions in the function 131 to initialize a respective data value associated with the function a first time when the function is called, the respective data value associated with GE1 being unchanged each successive time the function 131 is called by another function in source code 105 to obtain the respective data value associated with GE1. Consequently, an initialized variable is not reinitialized each successive time the function 131 is called.

One benefit of converting one or more global elements 125 to functions in source code 105 via techniques discussed herein is the ability to specify a location in a respective application file in which to store a newly created function being used in lieu of the eliminated respective global element. For example, the newly created function providing functionality of the eliminated global element can be more easily ordered in the application program using a link order file during a process of producing executable code from the source code 105. Thus, disk accesses associated with the application program derived from the source code 105 can be more efficient.

In one embodiment, there is no need to eliminate all global elements 125 defined in source code 105 to reduce a respective application program launch time. Instead, the source code modifier 140 can determine a degree to which inclusion of the global elements in the source code 105 will negatively impact (e.g., increase) launch time of respective application code if the source code 105 were compiled with the global elements to produce the respective application code. One way of determining how presence of a global element effects launch time is trial and error. In response to determining the degree to which inclusion of particular global elements 125 effects launch time, source code modifier 140 can selectively initiate replacement of none, some, or all global elements 125 present in the source code 105 to reduce the launch time associated with the application code derived from the source code 105.

Below are both examples rolled into one using the compile-time switch OLDWAY. If OLDWAY does not equal 0, then the code gets compiled using the old way of initialization, otherwise one obtains the method according to embodiments herein.

```
#include <math.h>
class MyObject
{
    public:
        MyObject( ) {     FILE* fp =    fopen("xyzzy", "r");
                                        fgets(mCharacters, 32767, fp);
                                        fclose(fp); }
        long GetLength( ) const { return strlen(mCharacters); }
    protected:
        char    mCharacters[32767];
};
#if OLDWAY
double    gSquareRootOfTwo = sqrt(2.0);
MyObject gMyObject;
#else
double GetSquareRootOfTwo( )
{
    static bool inited = false;
    static double squartRootOfTwo;
    if (!inited)
    {
        squartRootOfTwo = sqrt(2.0);
        inited = true;
    }
    return squartRootOfTwo;
}
MyObject& GetMyObject( )
{
    static MyObject    myObject;
```

-continued

```
    return myObject;
}
#endif
int main(void)
{
#if OLDWAY
    if (rand( ) %2 == 0)
        printf("size is %d.",gMyObject.GetLength( ));
    else
        printf("size is %.",gSquareRootOfTwo);
#else
    if (rand( ) %2 == 0)
        printf("size is %d.",GetMyObject( ).GetLength( ));
    else
        printf("size is %.",GetSquareRootOfTwo( ));
#endif
    return 0;
}
```

Not that code following #OLDWAY (e.g., if OLDWAY does not equal one) in the above source code describes conventional techniques, while alternate code (under #else) corresponds to techniques herein as generally discussed above with respect to FIG. 1. According to a conventional way of programming, there are two global elements that are initialized every time the application starts up. Each negatively impacts application program launch time in their own way as will be further discussed.

Regarding gSquareRootOfTwo, which is a global variable according to conventional techniques, there are two problems. The first is that many compilers do not provide a way to store a floating point number (2.0) in an executable. This means at startup of an application program derived from this sample source code, code needs to be generated by the compiler to convert the value 2 decimal to 2.0 floating point. At that point, the second problem occurs. For example, the 2.0 floating point is passed into another library function sqrt( ) to make the actual conversion. This requires a lot of processing time and reduces application program launch time of an executable program derived from this source code.

Also, MyObject is a C++ object. This is a worse-case scenario. When this "object" is created, the application program at launch time opens a file and access data within its initializer. This is very time consuming during application program launch time making it very slow.

Thus, according to conventional techniques as defined under OLDWAY !=0, before main( ) is ever called, both the sqrt (2.0) and MyObject( ) will be initialized. So then if OLDWAY=0 (according to the techniques herein), then nothing happens until we actually get to main( ). Then, only if we go down the path for GetMyObject or the GetSquareRootOfTwo will they be computed. Also, note that only one of them will be computed. The other is not used and, therefore, embodiments herein do not waste the time calculating it.

Figure 2:
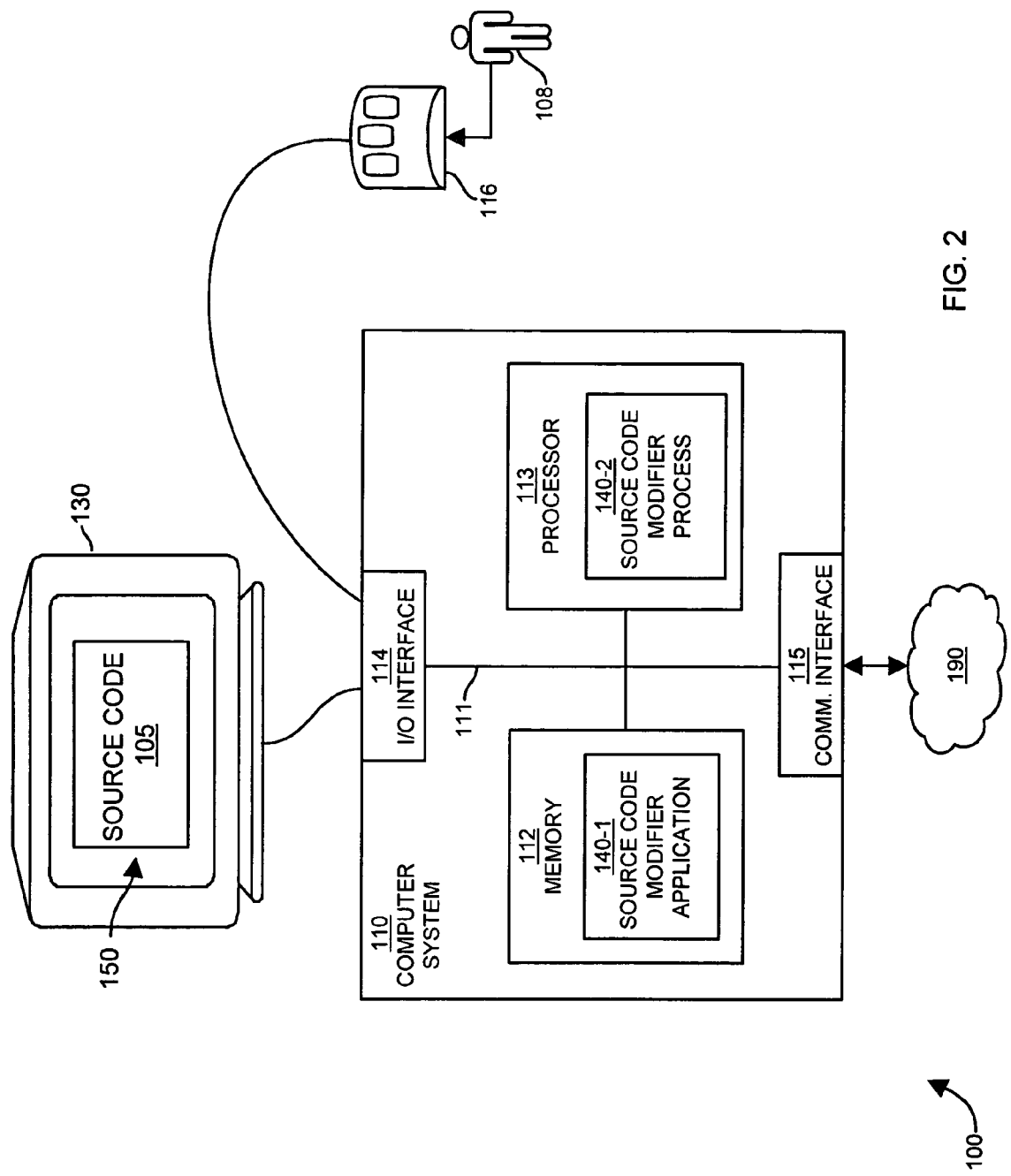
FIG. 2 is a block diagram of a processing device suitable for executing a source code modifier application according to an embodiment herein.

FIG. 2 is a block diagram of a computer environment 200 illustrating an example architecture of a computer system 110 for implementing source code modifier application 140-1 according to embodiments herein. Computer system 110 can be a computerized device such as a personal computer, workstation, portable computing device, console, network terminal, processing device, etc. As shown, computer system 110 of the present example includes an interconnect 111 that couples a memory system 112, a processor 113, I/O interface 114, and a communications interface 115. I/O interface 114 potentially provides connectivity to peripheral devices such as a keyboard, mouse, display screens, etc. Communications interface 115 enables computer system 110 to communicate over network 190 to retrieve and transmit information from remotely located sources if necessary.

As shown, memory system 112 is encoded with a source code modifier application 140-1 that supports either automatically modifies source code 105 or enables manual modification of source code 105 by user 108. Source code modifier application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the source code modifier application 140-1. Execution of the source code modifier application 140-1 produces processing functionality in source code modifier process 140-2. In other words, the source code modifier process 140-2 represents one or more portions of the source code modifier 140 performing within or upon the processor 113 in the computer system 110.

It should be noted that, in addition to the source code modifier process 140-2, embodiments herein include the source code modifier application 140-1 itself (i.e., the unexecuted or non-performing logic instructions and/or data). The source code modifier application 140-1 may be stored on a computer readable medium such as a floppy disk, hard disk or in an optical medium. According to other embodiments, the source code modifier application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of source code modifier application 140-1 in processor 113 as the source code modifier process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with source code modifier application 140 will now be discussed via flowcharts in FIGS. 3 and 4. For purposes of this discussion, computer system 110 or source code modifier application 140 (e.g., source code modifier application 140-1 and/or source code modifier process 140-2) generally performs steps in the flowcharts. Additionally, embodiments herein include a human operator that manually performs operations executed by computer system 110. For example, as mentioned, a human operator can perform a search and replace function with respect to contents of the source code 105.

Note that there will be some overlap with respect to concepts discussed above for FIGS. 1 and 2. Also, note that the steps in the below flowcharts need not always be executed in the order shown.

Figure 3:
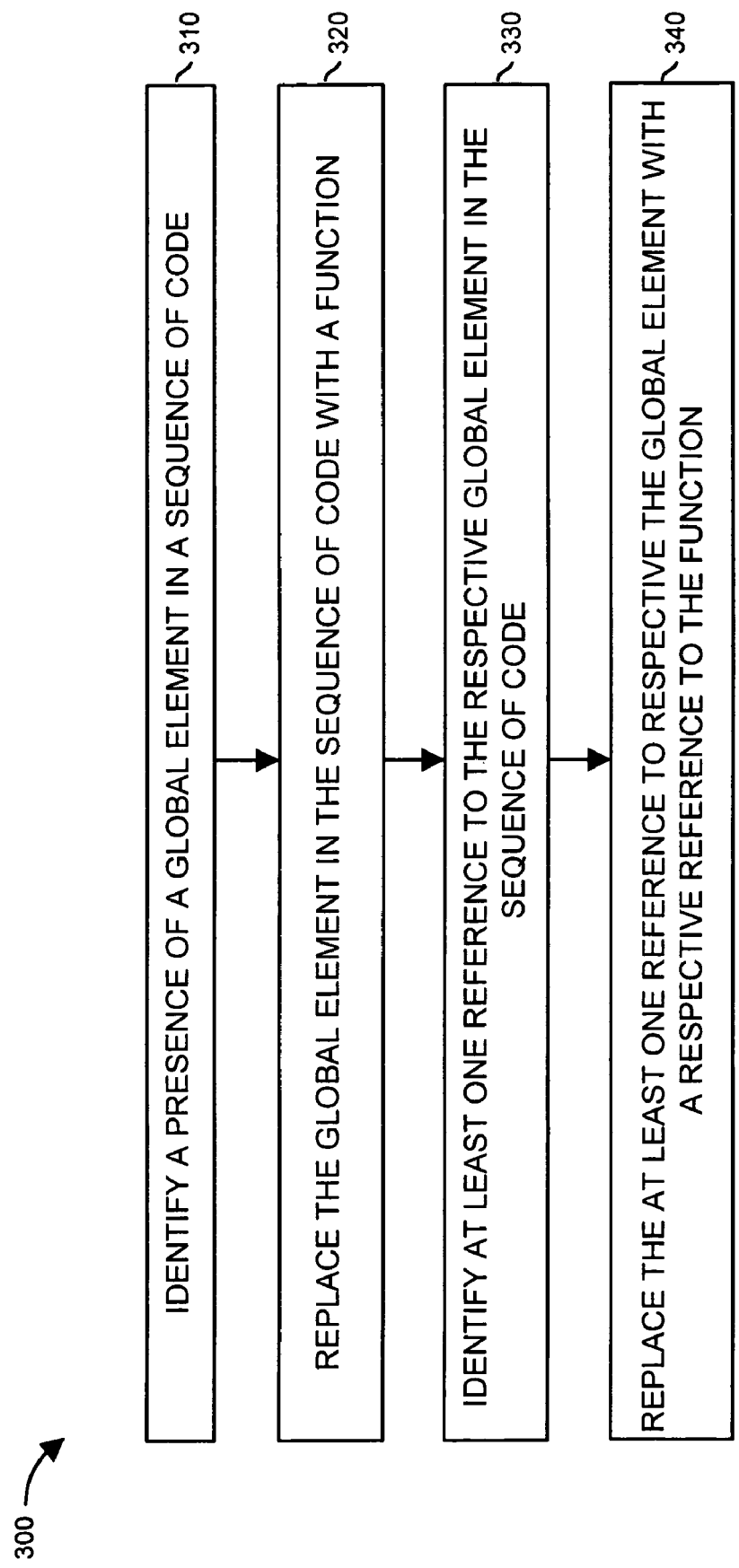
FIG. 3 is a flowchart illustrating techniques associated with modifying source code according to an embodiment herein.

FIG. 3 is a flowchart 300 illustrating a technique of modifying source code 105 to reduce application program launch time according to an embodiment herein. References in FIG. 3 will be made to matter discussed with respect to FIGS. 1 and 2.

In step 310, source code modifier 140 identifies a presence of a global element such as global element GE1 in source code 105 (e.g., a sequence of programming code).

In step 320, source code modifier 140 replaces the global element in the source code 105 with a function 131 called NEWFUNCTION. Recall that function 131 provides at least a portion of the functionality previously provided by global element GE1.

In step 330, source code modifier 140 identifies at least one reference to the global element GE1 in the source code 105. In the present example, the reference to GE1 occurs in function 132.

In step 340, source code modifier 140 replaces the at least one reference (e.g., the reference in function 132) to the global element with a respective at least one reference to function 131 named NEWFUNCTION.

FIG. 4 is a flowchart 400 illustrating more specific techniques associated with embodiments herein. Note again that steps in flowchart 400 can be manually performed by user 108 as well as automatically performed by source code modifier 140 as previously discussed.

In step 410, source code modifier 140 (or user 108) analyzes a sequence of code (e.g., source code 105) to determine whether inclusion of a global element in the sequence of code during compilation results in generation of corresponding initialization code that would negatively impact launch time of respective application code if the sequence of code were compiled with the global element to produce the respective application code.

In step 420, in response to detecting that compilation of the sequence of code including the global element would result in generation of the corresponding initialization code (that negatively impacts launch time), the source code modifier 140 initiates replacement of the global element in the sequence of code with a newly created function as well as replacement of references to the global element with respective references to the newly created function that provides the functionality of the eliminated global element.

In step 430, the source code modifier 140 initiates elimination of a global element from the sequence of code.

In step 440, the source code modifier 140 initiates creation of a function in the sequence of code to support at least a portion of functionality previously provided by the global element being eliminated.

In step 450, the source code modifier 140 initiates elimination of one or more references to the respective global element.

In step 460, in place of the eliminated one or more references to the global element, the source code modifier 140 initiates inclusion of one or more references to the newly created function.

Note again that techniques herein are well suited for use in reducing a launch time associated with an application program derived from source code. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method for enhancing performance of code at application launch time, the method comprising:
identifying a location in which a global element is initialized in a sequence of code, the global element being accessible throughout the sequence of code;
eliminating the global element at the location in the sequence of code;

adding a new function to the sequence of code, the new function providing functionality associated with the global element;

identifying at least one reference to the global element in the sequence of code;

replacing the at least one reference to the global element with a respective reference to the new function;

creating the new function in the sequence of code to support at least a portion of functionality previously provided by the eliminated global element;

wherein identifying the at least one reference to the global element in the sequence of code includes identifying a given function in the sequence of code, the given function referencing the global element being eliminated from the location; and wherein replacing the at least one reference to the global element with a respective reference to the new function includes:

eliminating a reference in the given function, the reference in the given function referring to the global element being eliminated from the location; and in place of the reference being eliminated from the given function, adding a reference to the new function, the reference to the new function enabling the given function to obtain a data value associated with the global element from the new function instead of the global element in the location.

2. A method as in claim 1, wherein the global element is accessible by any statement in the sequence of code, the method further comprising:

compiling the sequence of code to derive an application program that launches faster than a compiled sequence of code that does not include a replacement of the global element and the at least one reference to the global element.

3. A method as in claim 1, wherein the global element is selected from a group consisting of: i) a globally defined variable, ii) a static variable, and iii) an object; and wherein steps of eliminating the global element at the location and replacing the at least one reference to the global element with a respective reference to the new function reduces a launch time associated with a corresponding application derived from compiling the sequence of code.

4. A method as in claim 1, wherein compilation of the sequence of code including the respective global element would result in generation of initialization code in corresponding executable code derived from the sequence of code, the initialization code associated with the global element in the executable code required to be executed before calls to any functions in the sequence of code, elimination of the global element from the sequence of code reducing launch time of the corresponding executable code by eliminating presence of the initialization code that needs to be run prior to executing any functions defined in the sequence of code.

5. A method as in claim 1 further comprising:

prior to replacement of the global element with the new function, analyzing the sequence of code to determine whether inclusion of the global element in the sequence of code would result in generation of corresponding initialization code that would negatively impact launch time of respective application code if the sequence of code were compiled with the global element to produce the respective application code.

6. A method as in claim 5, wherein analyzing the sequence of code involves searching the sequence of code for the global element declaration, the global element being associated with a type from the group consisting of: a) a globally defined variable, b) a static variable, and c) an object that are accessible by at least one function in the source code.

7. A method as in claim 1 further comprising:

defining the new function to include a local static variable for maintaining a data value previously maintained by the global element that was eliminated, the local static variable and respective data value in the local static variable persisting even after a call to the new function to access the respective data value.

8. A method as in claim 1 further comprising:

defining the new function so that a respective data value associated with the new function is initialized only upon first execution of the new function during execution of corresponding executable code, the corresponding executable code derived from compiling the sequence of code.

9. A method as in claim 1 further comprising:

providing instructions in the new function to initialize a respective data value associated with the new function a first time when the new function is called, the respective data value being associated with the global element and being unchanged each successive time the new function is called to obtain the respective data value.

10. A method as in claim 1 further comprising:

prior to replacement of the global element with the new function, determining a degree to which inclusion of the global element in the sequence of code would negatively impact launch time of respective application code if the sequence of code were compiled with the global element to produce the respective application code; and initiating replacement of the global element with the new function to reduce the launch time associated with the application code derived from the sequence of code.

11. A computer program product including a computer-readable storage medium having instructions stored thereon for processing data information, such that the instructions, when carried out by a processing device, enable the processing device to perform the operations of:

identifying a location in which a global element is initialized in source code, the global element being accessible throughout the source code;

eliminating the global element at the location in the source code;

adding a new function to the sequence of code, the new function providing functionality associated with the global element;

identifying at least one reference to the global element in the source code; and replacing the at least one reference to the global element in the source code with a respective reference to the new function;

creating the new function in the sequence of code to support at least a portion of functionality previously provided by the eliminated global element;

wherein identifying the at least one reference to the global element in the sequence of code includes identifying a given function in the sequence of code, the given function referencing the global element being eliminated from the location; and wherein replacing the at least one reference to the global element with a respective reference to the new function includes:

eliminating a reference in the given function, the reference in the given function referring to the global element being eliminated from the location; and in place of the reference being eliminated from the given function, adding a reference to the new function, the reference to the new function enabling the given function to obtain a data value associated with the global element from the new function instead of the global element in the location.

12. A computer program product as in claim 11, the computer program product further supporting operations of:
initiating compilation of the source code to derive an application program that launches faster than a compiled sequence of code that does not include a replacement of the global element and the at least one reference to the global element.

13. A computer program product as in claim 11, wherein compilation of the sequence of code including the respective global element would result in generation of initialization code in corresponding executable code derived from the sequence of code, the initialization code associated with the global element in the executable code required to be executed before calls to any functions in the sequence of code, elimination of the global element from the sequence of code reducing launch time of the corresponding executable code by eliminating presence of the initialization code that needs to be run prior to executing any functions defined in the sequence of code.

14. A computer program product as in claim 11, the computer program product further supporting operations of:
prior to replacement of the global element with the new function, analyzing the sequence of code to determine whether inclusion of the global element in the sequence of code would result in generation of corresponding initialization code that would negatively impact launch time of respective application code if the sequence of code were compiled with the global element to produce the respective application code.

15. A computer program product as in claim 11, the computer program product further supporting operations of:
providing instructions in the new function to initialize a respective data value associated with the new function a first time when the new function is called, the respective data value being associated with the global element and being unchanged each successive time the new function is called to obtain the respective data value.

16. A computer program product as in claim 11, the computer program product further supporting operations of:
during a process of producing executable code from the sequence of code, specifying a location in a respective application file to store the new function.

17. A computer program product as in claim 11, the computer program product further supporting operations of:
prior to replacement of the global element with the new function, determining a degree to which inclusion of the global element in the sequence of code would negatively impact launch time of respective application code if the sequence of code were compiled with the global element to produce the respective application code; and
initiating replacement of the global element with the new function to reduce the launch time associated with the application code derived from the sequence of code.

18. A computer system for displaying information, the computer system comprising:
a processor;
a memory unit that stores instructions associated with an application executed by the processor; and
an interconnect coupling the processor and the memory unit, enabling the computer system to execute the application and perform operations of:
identifying a location in which a global element is initialized in source code, the global element being accessible throughout the source code;
eliminating the global element at the location in the source code;
adding a new function to the source code, the new function providing functionality previously provided by the global element in the location of the source code;
identifying at least one reference to the global element in the source code; and
replacing the at least one reference to the global element in the source code with a respective reference to the new function;
creating the new function in the sequence of code to support at least a portion of functionality previously provided by the eliminated global element;
wherein identifying the at least one reference to the global element in the sequence of code includes identifying a given function in the sequence of code, the given function referencing the global element being eliminated from the location; and
wherein replacing the at least one reference to the global element with a respective reference to the new function includes:
eliminating a reference in the given function, the reference in the given function referring to the global element being eliminated from the location; and
in place of the reference being eliminated from the given function, adding a reference to the new function, the reference to the new function enabling the given function to obtain a data value associated with the global element from the new function instead of the global element in the location.

19. A method as in claim 1 further comprising:
generating the new function to include a declaration initializing a local element, the local element being used to represent data that was previously represented by the global element being eliminated.

20. A method as in claim 19, wherein the reference to the new function enables the given function to call the new function and retrieve the respective data stored in the local element, instead of having to retrieve the respective data from the global element.

21. A method as in claim 20, wherein the local element in the new function is initialized with the respective data in response to a call by the given function to the new function.

22. A method as in claim 1, wherein, subsequent to eliminating the global element, the global element is no longer globally accessible based on calls made by functions in the sequence of code.

23. A method as in claim 1, wherein the respective reference to the new function enables the given function to call the new function for retrieving the data associated with the global element as data being passed back from the new function.

24. A method as in claim 1, wherein eliminating the global element at the location in the sequence of code prevents the global element from being initialized upon execution of the code at launch time.

25. A method as in claim 1 further comprising:
redefining the global element as a local element that is only accessible via a call to the new function.

* * * * *